June 24, 1952 G. T. BAKER 2,601,492
MEASURING ARRANGEMENTS
Original Filed Jan. 7, 1949 2 SHEETS—SHEET 2
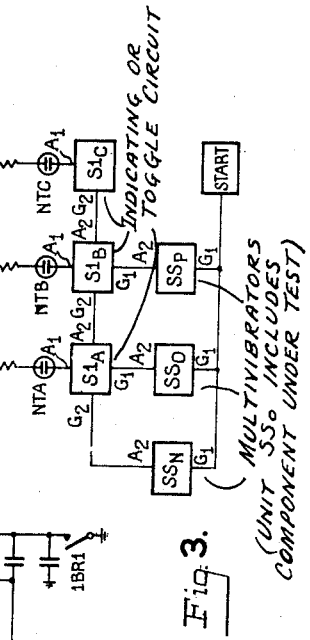
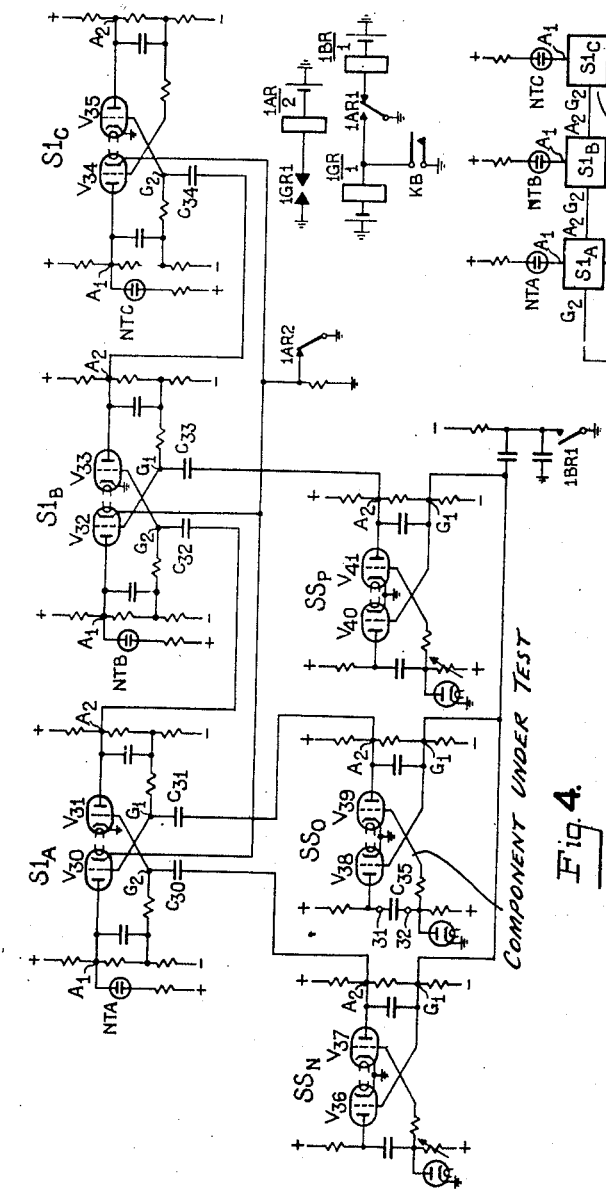
Fig. 3.
Fig. 4.
INVENTOR
GEORGE THOMAS BAKER
BY
Lippincott & Smith
ATTORNEYS Patented June 24, 1952

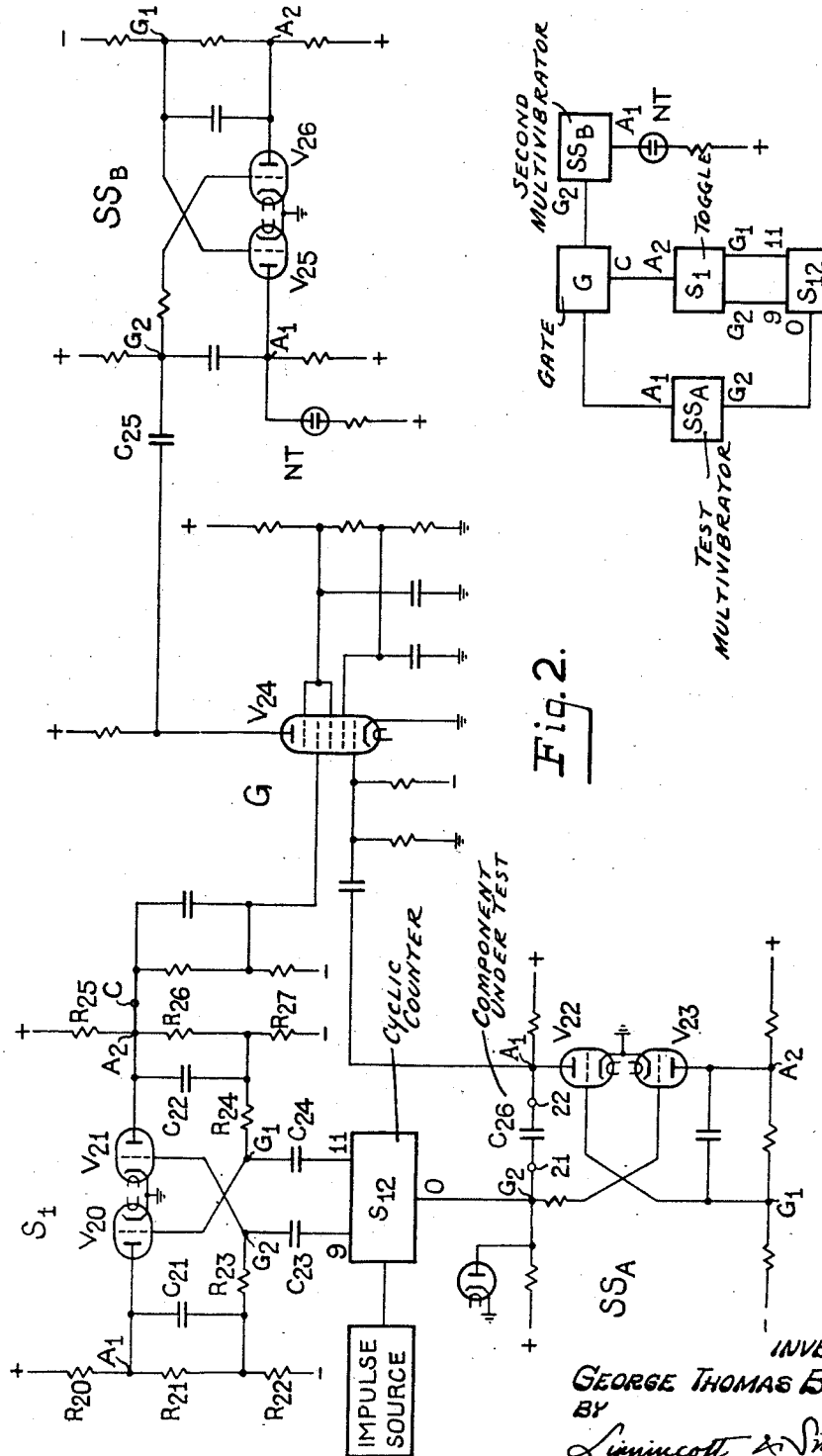

2,601,492

UNITED STATES PATENT OFFICE 2,601,492

MEASURING ARRANGEMENTS

George Thomas Baker, Liverpool, England, assignor to Automatic Telephone & Electric Company Limited, Liverpool, England, a British company Original application January 7, 1949, Serial No. 69,690. Divided and this application June 19, 1950, Serial No. 168,995. In Great Britain January 30, 1948

9 Claims. (Cl. 175—183)

The present invention relates to circuit arrangements employed for indicating the value of electrical components such as condensers and resistances.

It is known to measure a short time interval by employing a resistance/condenser combination arranged so that the condenser discharges through the resistance. The time interval is given by $$t = CR \log \frac{E_0}{E_t}$$

where $E_0$ is the voltage across the condenser at the beginning of the interval and $E_t$ is the voltage across the condenser at the end of the interval. From this equation it will be seen that if $$\frac{E_0}{E_t}$$

and either C or R is fixed, the equation becomes $$C = K_1 t \text{ or } R = K_2 t$$

thus the value of the condenser or resistance is directly proportional to the time taken for the voltage across the condenser in a resistance/condenser combination to change from one predetermined value to another. Copending U. S. patent application of this applicant, Serial No. 69,690, filed January 7, 1949, from which the present application is divided, makes use of this relationship to give an indication of the value of a condenser or a resistance.

One of the objects of the present invention is to provide a circuit arrangement whereby an indication is given as to whether the value of a component lies between two limiting values.

Another object of the present invention is to provide a circuit arrangement whereby in addition to giving an indication if the value of the component falls within the limiting values, an indication is also given, if the value is outside the limiting values, as to whether the value is above or below the limiting values.

According to a feature of the invention, in a circuit arrangement for indicating whether the value of a resistance or a condenser is between two limiting values means are provided for charging and discharging the condenser in a resistance/condenser combination which includes the component to be tested and the time taken for the voltage across the condenser to change from one predetermined value to another predetermined value is compared with two time intervals corresponding to the two limiting values of the component, an indication being given whether the discharge time has a value between the two comparison time intervals.

In one embodiment of the invention for determining whether the value of the component lies between two limiting values, a gate circuit is opened and closed at times during the discharge period of the condenser which correspond to the limiting values. Only if the component under test has a value between the limiting values will an impulse pass through the gate to control an indicator such as, for instance, a discharge tube.

In a further embodiment of the invention for the same purpose, the discharge time interval is compared with two known time intervals by the use of three relaxation circuits. Two of the circuits include components of known value while the third includes the component under test. By suitably connecting the outputs of the relaxation circuits to an indicator comprising a plurality of discharge tubes, the tubes can be arranged to indicate not only whether the component value is within the desired limits but also if it is not whether the value is below or above said limits.

It frequently happens that repetitive measurements have to be made on a component. Normally each measurement is initiated by a key or like operation. Such repetitive key operation becomes tedious and it is a further object of the invention to provide circuit arrangements which avoid this necessity.

According to this feature of the invention a pair of electromagnetic relays are provided and arranged for automatic sequential operation, one of the relays serving to reset the counting circuit while the other initiates a measuring cycle.

The invention will be better understood from the following description of a number of embodiments taken in conjunction with the accompanying drawings and comprising Figs. 1 to 4. In the drawings, Fig. 1 shows a block schematic of an arrangement for indicating whether the value of a condenser or a resistance approximates within predetermined limits to a nominal value while Fig. 2 shows the detailed circuit.

Fig. 3 shows an alternate arrangement to that of Fig. 1 and in addition is so arranged that if the component value is outside the predetermined limits, an indication is given whether the value is above or below such limits while Fig. 4 shows the detailed circuit.

Assume that a number of condensers are manufactured having a nominal capacitance of $C_n$. If the constant of proportionality of $K_1$ referred to previously is made equal to $10C_n$ and a 1 kc./s.

pulse source is used, a capacitance of exactly $C_n$ will indicate 100 time units while the count on any other component will indicate directly its relationship to the nominal value. For production testing it is usually sufficient to indicate whether the deviation exceeds a specified value. For instance, a common tolerance is 10% i. e. for a nominal value of 10 time units the unknown capacitance must register more than 9 and less than 11.

Referring now to the drawings it should be explained that the references such as $A_2$, $G_1$ and C shown in Figs. 1 and 3 correspond to the anode of the valve $V_{20}$, the grid of the valve $V_{21}$ and the signal input to the gate valve $V_{24}$. In the arrangement shown in Fig. 1 six scale-of-two circuits are interconnected to form a twelve point cyclic counter $S_{12}$. This is driven continuously from a suitable pulse source and in the zero position, a start pulse is applied to the test multivibrator $SS_A$ comprising two back coupled valves $V_{22}$ and $V_{23}$, the coupling between the anode of $V_{22}$ and the control grid of $V_{23}$ being A. C. while that between the anode of $V_{23}$ and the control grid of $V_{22}$ is D. C. so that the stage has one stable and one unstable condition of equilibrium. The stable condition corresponds to the flow of current through the valve $V_{23}$. The start impulse causes the multivibrator $SS_A$ to be transposed and a negative-going pulse is applied to the inner control grid of the gate valve of the gate circuit G. This negative-going pulse is, however, without effect since the gate valve is already cut-off on the inner grid. The 9th and 11th pulses from the counter $S_{12}$ are applied to a so-called "toggle" circuit $S_1$ which is simply a circuit having two stable states of equilibrium. The circuit $S_1$ controls the opening and closing of the gate circuit and the arrangement is such that the gate is opened on the 9th and closed on the 11th pulse.

If now the test multivibrator $SS_A$ reverts to its normal condition while the gate circuit is opened, that is to say, between the 9th and 11th pulses, a negative-going pulse will be developed in the anode circuit of the gate valve $V_{24}$ and this will be applied to a second multivibrator $SS_B$ which is again similar to the test multivibrator and which acts as a pulse-lengthener. The transposition of the pulse-lengthener due to the negative-going pulse causes the neon tube associated with the pulse-lengthening circuit to flash thereby indicating that the condenser has a value within the stated limits. It will be understood that if the test multivibrator $SS_A$ reverts to its normal condition before the 9th or after the 11th pulse, no pulse will be developed in the anode circuit of the gate valve and the neon tube will not flash.

Referring now to the detailed circuit shown in Fig. 2 the toggle circuit $S_1$ consists of two cross-connected valves $V_{20}$ and $V_{21}$ each having an anode load $R_{20}$ and $R_{25}$ and feed-back circuits from the anode of $V_{20}$ via $R_{21}$, $C_{21}$ and $R_{23}$ to the grid of $V_{21}$ and from the anode of $V_{21}$ via $R_{26}$, $C_{22}$ and $R_{24}$ to the grid of $V_{20}$, the resistances $R_{21}$ and $R_{26}$ being connected to the negative terminal of the supply voltage via resistances $R_{22}$ and $R_{27}$. The values of the various resistances in the toggle circuit are such that the circuit is negatively polarised. The cyclic counter $S_{12}$ is not shown in detail since the circuit is well known and similarly the pulse source for driving the counter is not shown.

In the normal condition of the test multivibrator, valve $V_{23}$ will be conducting and $V_{22}$ will be non-conducting. The zero negative-going pulse from the counter is applied to the grid of $V_{23}$ which transposes the condition of the multivibrator so that $V_{22}$ conducts and a negative-going pulse is developed across the anode load. This is without effect on the inner grid of the gate valve $V_{24}$ since this grid is already biased to cut off. In the toggle circuit $S_1$, the normal condition is with the valve $V_{20}$ non-conducting and the valve $V_{21}$ conducting. The potential at the point $A_2$ is, therefore, low and hence the fourth grid of the gate valve $V_{24}$ is biased negatively with respect to the cathode. The 9th pulse from the cyclic counter is applied via $C_{23}$ to the grid of $V_{21}$ whereby the condition of the circuit is transposed and $V_{21}$ now becomes non-conducting. The voltage at the point $A_2$, therefore, rises and the potential of the fourth control grid of the gate valve $V_{24}$ becomes positive with respect to the cathode and the gate is opened. The 11th impulse from the counter is applied via $C_{24}$ to the control grid of $V_{20}$ and causes the circuit $S_1$ to revert to its normal condition and the potential of the fourth grid now becomes negative with respect to the cathode and the gate is closed.

The time taken for the test multivibrator $SS_A$ to revert to its original condition will be determined by the value of the condenser $C_{26}$ under test and if this reversion takes place between the 9th and 11th pulse, indicating that the value of the condenser is within the specified limits, then a positive-going pulse will be developed in the anode circuit of $V_{22}$ and will be applied to the inner grid of the gate valve $V_{24}$ at a time when the gate is open. A negative-going pulse will be developed in the anode circuit of the gate valve and this will be fed via the condenser $C_{25}$ to the control grid of the valve $V_{26}$. The normal condition of the pulse lengthening circuit is for $V_{26}$ to be conducting and $V_{25}$ to be non-conducting so that there is not sufficient potential across the neon tube NT to cause it to flash. The pulse obtained from the anode of the valve $V_{24}$ will be negative-going and will transpose the pulse lengthening circuit so that $V_{25}$ now conducts and the voltage at the point $A_1$ will fall to such an extent that the neon tube will flash. It will be understood that the neon tube will only remain lighted for the time taken for the pulse lengthening circuit to revert to its normal condition and this duration is suitably selected so that the lighting of the neon tube is easily visible.

It will be understood that the circuit will operate continuously so that if desired, a number of tests may be made on each component. Once the high tension supply is connected to the circuit the only operation necessary to effect the test is to connect the condensers one by one to the terminals 21 and 22. Thus the whole equipment may be controlled by a single switch for connecting up the H. T. supply and a pair of terminals will be provided on the panel of the instrument to which the component under test is connected.

The circuit shown in Figs. 3 and 4 is a refinement of that shown in Figs. 1 and 2 in that if the value of the component is not within the specified limits, an indication is given as to whether it is below or above such limits. Referring first to Fig. 3, the equipment comprises three multivibrators $SS_N$, $SS_O$ and $SS_P$ of which the multivibrator $SS_O$ includes the component under test. The other two multivibrators include fixed condensers and provide two time periods, a minimum $T_N$ and a maximum $T_P$. The actual time $T_O$ corresponding to the nominal value of the capacitor is immaterial but is conveniently taken to be about 0.4 second, corresponding to a 1µf. condenser associated with a 100 k. ohms resistance. Part of the resistance in the timing circuit of the multivibrator $SS_N$ is made variable and a similar variable is employed in the timing circuit of the multivibrator $SS_P$. Over the range covered, time is linear with resistance so that the scales of the variables can be calibrated directly in percentage decrease or increase on $T_O$. The resistance associated with the multivibrator $SS_O$ can be set so that the nominal capacitance of the unknown condenser corresponds to a release time of $T_O$. For a condenser within the specified limits, $T_N<T_O<T_P$ so that if the three multivibrators are set in operation simultaneously, they will revert in the order $SS_N$, $SS_O$, $SS_P$. The order in which they actually revert is indicated by three indicating or toggle circuits $S1_A$, $S1_B$ and $S1_C$. In the normal condition of these circuits the neon tubes NTA, NTB and NTC are extinguished. If the multivibrator $SS_N$ reverts to its normal condition before the multivibrator $SS_O$, a pulse is fed from $SS_N$ to $S1_A$ to cause the neon tube NTA to glow. Then when the multivibrator $SS_O$ reverts, the tube NTA is extinguished and a negative pulse is fed from $S1_A$ to $S1_B$ to cause the neon tube NTB to glow. Finally when the multivibrator $SS_P$ reverts, the neon tube NTB is extinguished and a negative pulse is fed to $S1_C$ to cause the neon tube NTC to glow. When the test has been completed, the neon tube NTC is extinguished and a second start signal is given by relay equipment similar to that shown in Fig. 2.

If however, the multivibrator $SS_O$ reverts before the multivibrator $SS_N$, the pulse applied to $S1_A$ by $SS_O$ will be without effect while that subsequently applied by $SS_N$ will cause the neon tube NTA to glow but neither the neon tube NTB nor NTC will glow since no pulse is passed on from $S1_A$ to $S1_B$ or $S1_B$ to $S1_C$. Further the reversion of $SS_P$ is without effect, so that the tube NTA continues to glow. Again if the multivibrators $SS_N$ and $SS_P$ the neon tube NTA will glow when $SS_N$ reverts and will be extinguished when $SS_O$ reverts and a pulse will be fed over $S1_A$ to $S1_B$ to cause the neon tube NTB to glow. This tube will, however, glow after the normal extinguishing pulse has been fed thereto by the multivibrator $SS_P$ and consequently no pulse will be fed to $S1_C$. In this condition, therefore, the neon tube NTB remains lighted.

Thus if the condenser is within the specified limits, the neon tube NTC remains lighted while if the value is less than the lower limit the neon tube NTA remains lighted, and if it is greater than the maximum limit the neon tube NTB remains lighted.

Referring now to Fig. 4 which shows the circuits in detail, the multivibrators $SS_N$, $SS_O$ and $SS_P$ are similar to the multivibrator $SS_A$ shown in Fig. 2 while the indicating or toggle circuits $S1_A$, $S1_B$ and $S1_C$ are similar to the toggle circuit $S1$ shown in Fig. 2, and are also arranged to respond only to negative-going impulses, the negative bias applied to the control grids being sufficiently large to prevent triggering by any of the positive-going impulses applied thereto.

The condenser under test is connected between terminals 31 and 32 in the multivibrator $SS_O$ and it will be understood that the normal condition of the multivibrators is with the valves $V_{37}$, $V_{39}$ and $V_{41}$ conducting. As regards the toggle circuits the normal condition is with the valves $V_{31}$, $V_{33}$ and $V_{35}$ conducting.

A start pulse is applied to the three multivibrators in parallel by the operation of relay 1BR. This start pulse will be positive-going and is applied to the grids of the non-conducting valves $V_{36}$, $V_{38}$ and $V_{40}$. The three multivibrators are transposed substantially simultaneously and consequently positive-going pulses will be developed at the points $A_2$. These positive-going pulses will be applied to the toggle circuits $S1_A$ and $S1_B$ but as previously pointed out, they will be without effect as the toggle circuits are polarised to respond only to negative pulses. Assuming first that the condenser under test is within the specified limits, then the multivibrator $SS_N$ will be the first to revert to normal. When this takes place, the valve $V_{37}$ becomes conducting and a negative-going pulse is fed from the anode of $V_{37}$ via condenser $C_{30}$ to the grid of valve $V_{31}$ which it will be remembered is conducting. This pulse, therefore, causes the toggle circuit to be transposed so that the anode voltage of $V_{31}$ increases and that of $V_{30}$ decreases. The increase in anode voltage of $V_{31}$ is without effect on the toggle circuit $S1_B$ while the decrease of anode voltage of $V_{30}$ causes a potential difference to be developed across the neon tube NTA which thereupon glows.

The circuit remains in this condition until the multivibrator $SS_O$ reverts to normal when a negative-going pulse from the anode of $V_{39}$ is applied via the condenser $C_{31}$ to the grid of $V_{30}$. This causes the toggle circuit $S1_A$ to revert to its original condition whereby the neon tube NTA is extinguished and a negative-going pulse is fed from the anode of $V_{31}$ via condenser $C_{32}$ to the grid of $V_{33}$ of the toggle $S1_B$. The toggle $S1_B$ is thereby transposed and the neon tube NTB glows in a similar manner to that described for the toggle circuit $S1_A$. The circuit remains in this condition until the multivibrator $SS_P$ reverts to normal when a negative-going pulse from the anode of $V_{41}$ is fed via condenser $C_{33}$ to the grid of $V_{32}$ thereby causing the neon tube NTB to be extinguished and a negative-going pulse to be fed from the anode of $V_{33}$ via condenser $C_{34}$ to the grid of the valve $V_{35}$ of the toggle circuit $S1_C$. This toggle circuit is consequently transposed and the neon tube NTC is lighted. The circuit remains in this condition until relay 1AR is again operated when resistance earth is connected in place of direct earth to the cathodes of the valves $V_{30}$, $V_{32}$ and $V_{34}$ thus causing any operated toggle circuit to be restored to normal.

It will now be assumed that the value of the condenser under test is below the lower of the specified limits. In this case the multivibrator $SS_O$ will revert to normal before the multivibrator $SS_N$. When the multivibrator $SS_O$ reverts, a negative pulse will be applied via condenser $C_{31}$ to the grid of $V_{30}$ but will be without effect since this valve is non-conducting at this time. The negative-going pulse subsequently obtained from the multivibrator $SS_N$ will be applied via condenser $C_{30}$ to the grid of valve $V_{31}$ and will cause the toggle circuit $S1_A$ to be transposed as previously described. The neon tube NTA is, therefore, lighted and remains lighted since the pulse which would normally cause its extinction has already been received and has been without effect. Further when the multivibrator $SS_P$ reverts to normal a negative pulse will be applied via condenser C$_{33}$ to the grid of V$_{32}$ and this again will be without effect since the valve V$_{32}$ is non-conducting at this time. The neon tube NTA, therefore, remains lighted until the resetting pulse is provided on the operation of relay IAR.

If the valve of the condenser under test is above the upper specified limit, the multivibrator SS$_N$ will first revert and cause the lighting of the tube NTA as previously described. In this case the second multivibrator to revert will be SS$_P$ whereupon a negative-going impulse is applied via C$_{33}$ to the grid of V$_{32}$. This will be without effect since the valve V$_{32}$ is non-conducting at this time. When the multivibrator SS$_O$ finally reverts, the neon tube NTA will be extinguished and a negative-going pulse will be fed from SI$_A$ via C$_{32}$ to the grid of V$_{33}$ and the circuit SI$_B$ will be transposed to cause the lighting of the neon tube NTB and this tube will remain lighted until the resetting pulse is obtained by the operation of relay IA.

With regard to the generation of the start pulse, this is provided by a circuit which enables repetitive measurements to be effected automatically and consists of an interrupter circuit comprising relays IGR and IAR. Relay IGR may, for instance, consist of a type of relay known as a galvanometer relay having a pair of cobalt steel magnets forming an astatic combination, one of the magnets being almost completely enclosed by a pair of deflection coils. The periodic time of oscillation of the magnets is controlled by a spiral hair spring and a robust silver contact IGR1 is arranged to close at the end of the return swing, the hair spring being selected so that the galvanometer relay delivers one pulse every two seconds. The closure of contacts IGR1 closes the circuit for relay IAR which at contacts IAR1 completes the circuit for the coils of the galvanometer relay in order to maintain the oscillation. Relay IAR in operating in addition at contact IAR2 connects a resistance earth instead of direct earth to the cathode circuit of the normally non-conducting valves of the indicating circuits thus restoring any of these valves which may be conducting and setting the indicate circuits to normal. When relay IAR releases, relay IBR operates and as explained above, at contact IBR1 provides the start pulse for the circuits SS$_N$, SS$_O$ and SS$_D$. This operation proceeds continuously a test taking place at each operation of relay IBR so that repetitive testing is possible. In operation the voltage supply is first switched on and the key IKA is momentarily operated to cause the initial operation of relay IGR. After this operation relays IGR, IAR and IBR interact continuously and a condenser such as C$_{35}$ may be connected between terminals 31 and 32 on the front panel at any time and repetitive readings of the value of the condenser will continue to be given as long as the condenser is connected to the terminals.

I claim:

1. Circuit arrangements for testing resistors and capacitors and for indicating whether the value of the component under test is between two limiting values comprising a time-constant circuit including a combination of resistor and capacitor elements one of which elements is the component under test, means for generating a start signal, means for generating a first pulse a predeterminable time after said start signal to establish the lower of the two limiting values, means for generating a second pulse at a different predeterminable time after said start signal to establish the upper of the two limiting values, means including said resistor and capacitor combination for generating at a time subsequent to the development of said start signal a third pulse which is indicative of the value of the component under test, an indicating circuit, means for applying all of said first, second and third pulses to said indicating circuit and means for operating said indicating circuit to indicate whether said third pulse is applied to the indicating circuit after the application of said first pulse and before the application of said second pulse.

2. Circuit arrangements for testing resistors and capacitors and for indicating whether the value of the component under test is between upper and lower limiting tolerance values comprising a time-constant circuit including a combination of resistor and capacitor elements, one of which elements constitutes the component under test, means for generating a start signal, means for generating a first pulse a predeterminable time after said start signal to establish the lower of the two limiting values, means for generating a second pulse at a different predeterminable time after said start signal to establish the upper of the two limiting values, means including said resistor and capacitor combination for generating at a time subsequent to the generation of said start signal a third pulse which is indicative of the value of the component under test, a normally closed gate circuit, means for opening said gate circuit in response to the generation of said first pulse, means for closing said gate circuit in response to said second pulse, means for applying said third pulse to said gate circuit and indicating means connected to said gate circuit and operated in response to the application of said third pulse to said gate circuit while said gate circuit is open.

3. Circuit arrangements for testing resistors and capacitors and for indicating whether the value of the component under test is between two limiting values comprising a time-constant circuit including a resistor and a capacitor in combination, one of which constitutes the component under test, a control circuit operating normally to charge said capacitor, a cyclic electronic counter, a source of accurately timed pulses for driving said counter, means in said control circuit for initiating the discharge of said capacitor in response to the first impulse of a cycle delivered to said control circuit from said electronic counter, a normally closed gate circuit having an input circuit and an output circuit, means responsive to subsequent pulses delivered by said counter respectively for opening and closing said gate circuit, means in said control circuit for applying a pulse to the input to said gate circuit when the voltage across said capacitor reaches a predeterminable value, an indicator circuit connected to the output of said gate circuit and means responsive to the arrival of said pulse from said control circuit at the input to said gate circuit while said gate circuit is open for delivering a pulse to said output circuits for operating said indicator.

4. Circuit arrangements for testing resistors and capacitors and for indicating whether the value of the component under test is between two limiting values comprising a first relaxation circuit having one stable and one unstable condition of equilibrium, a time-constant circuit including resistance and capacitor elements of which one comprises the component to be measured and is included in the circuit determining the relaxation period of said first relaxation circuit, means for charging said capacitor with said first relaxation circuit in the stable condition, a cyclic electronic counter, a source of accurately timed impulses for driving said electronic counter, means responsive to the first impulse of a cycle delivered by said electronic counter for changing over said first relaxation circuit thereby initiating the discharge of said condenser, a second relaxation circuit having two stable conditions of equilibrium, means responsive to a subsequent impulse of a cycle from said electronic counter for changing over said second relaxation circuit from one stable condition to the second, a normally closed gate circuit having an input and an output, means responsive to the changeover of said second relaxation circuit for opening said gate circuit, means responsive to the last impulse of a cycle delivered by said electronic counter for changing over said second relaxation circuit from the second stable condition to the first, means responsive to the last changeover of said second relaxation circuit for closing said gate circuit, means for applying a pulse to the input of said gate circuit when said first relaxation circuit reverts to the stable condition in response to a predeterminable change in the voltage across said capacitor, an indicator circuit connected to the output of said gate circuit and means responsive to the arrival of said pulse from said first relaxation circuit at said gate circuit at a time when said gate circuit is open for delivering a pulse through said output circuit to operate said indicator circuit.

5. Circuit arrangements as claimed in claim 4 wherein said indicator circuit comprises a relaxation circuit having a stable and an unstable condition of equilibrium and a discharge tube connected to the anode circuit of the tube which is non-conducting in the stable condition of the relaxation circuit.

6. Circuit arrangements for testing resistors and capacitors and for indicating whether the value of the component under test is between two limiting values comprising, a first relaxation circuit having a stable and an unstable condition of equilibrium, a time-constant circuit including resistor and capacitor elements of which one element is the component under test, said time-constant circuit forming a part of the circuit determining the relaxation period of said first relaxation circuit, means for charging the capacitor of the time-constant circuit during the stable condition of the said relaxation circuit, a second relaxation circuit having first and second stable conditions of equilibrium, a cyclic electronic counter, a source of accurately timed pulses for driving said counter, means for transmitting the first pulse in a cycle from said electronic counter to said first relaxation circuit to change over said relaxation circuit to said unstable condition and thereby to initiate the discharge of said capacitor, means for transmitting subsequent pulses in the same cycle from said electronic counter to said second relaxation circuit to change over said second relaxation circuit from said first stable condition to said second stable condition and back to said first stable condition respectively, a normally closed gate circuit controlled by said second relaxation circuit and having an input circuit and an output circuit, a voltage source, means effective upon changeover of said second relaxation circuit from said first to said second stable condition for applying to said gate circuit a gate opening voltage derived from said voltage source and responsive to the changeover of said second relaxation circuit from said second to said first stable condition for applying a gate closing voltage derived from said voltage source to said gate circuit, means responsive to the changeover of said first relaxation circuit from the unstable to the stable condition for applying a pulse to the input circuit of said gate circuit, an indicator connected to the output of said gate circuit and means responsive to the arrival of said pulse from said first relaxation circuit at said gate circuit at a time when said gate circuit is open for delivering a pulse through said output circuit to operate said indicator.

7. Circuit arrangements for testing resistors and capacitors and for indicating whether the value of the component under test is between two limiting values, one above and one below an optimum value, and if not whether it is above or below said optimum value comprising a time-constant circuit including resistor and capacitor elements of which one constitutes the component to be tested, a first, a second and a third control circuit, means for simultaneously operating all said control circuits, means for causing said first control circuit to revert to the unoperated condition after a time period measuring the lower of said limiting values, means for causing said second control circuit to revert to the unoperated condition after a period measuring the upper of said limiting values, means including said time-constant circuit for causing said third control circuit to revert to the unoperated condition after a time period which is substantially a measure of the optimum value of the component to be tested, a first, a second and a third indicator means, means for operating said first indicator means at time periods when the third control circuit reverts to the unoperated condition prior to said first and second control circuits, means for operating said second indicator means at time periods when the third control circuit reverts to the unoperated condition subsequent to the first control circuit and prior to the second control circuit and means for operating the third indicator means at time periods when the third control circuit reverts to the unoperated condition subsequent to each of the second and third control circuits.

8. Circuit arrangements for testing resistors and capacitors and for indicating whether the value of the component under test is between two limiting values and if not whether it is above or below said limiting values comprising a time-constant circuit including a resistor and capacitor combination, of which one is the component to be tested, first, second and third control relaxation circuits each having one stable and one unstable condition of equilibrium, means for simultaneously changing over said first, second and third relaxation circuits from said stable to said unstable condition, a relaxation period determining circuit for said first relaxation control circuit for causing said circuit to revert to said stable condition in a time representative of the lower of said two limiting values, a relaxation period determining circuit for said second relaxation control circuit for causing said circuit to revert to said stable condition in a time representative of the upper of said two limiting values, a relaxation period determining circuit for said third relaxation control circuit including the resistor and capacitor combination time-constant circuit for causing said circuit to revert to said stable condition in a time representative of the value of the component under test, first, second and third relaxation indicator circuits each having a normal first condition of stable equilibrium and a second condition of stable equilibrium, a first connection between said first relaxation control circuit and said first relaxation indicator circuit for transmitting a pulse on the reversion of said first relaxation control circuit to the stable condition to change over said first relaxation indicator circuit from the normal stable condition to the second stable condition, a second connection between said third relaxation control circuit and said first relaxation indicator circuit for transmitting a pulse on the reversion of said third relaxation control circuit to the stable condition to change over said first relaxation indicator circuit from the second stable condition to the normal stable condition, a third connection between the second relaxation control circuit and said second relaxation indicator circuit for transmitting a pulse on the reversion of said second relaxation control circuit to the stable condition to change over said second relaxation indicator circuit from the second stable condition to the normal stable condition, a fourth connection between said first relaxation indicator circuit and second relaxation indicator circuit for transmitting a pulse to change over said second relaxation indicator circuit from the normal to the second condition on the changeover of said first relaxation indicator circuit from the second condition to the normal condition and a fifth connection between said second relaxation indicator circuit and said third relaxation indicator circuit for transmitting a pulse to change over said third relaxation indicator circuit from the normal to the second condition on the changeover of said second relaxation indicator circuit from the second condition to the normal condition.

9. Circuit arrangements as claimed in claim 8 comprising a cyclically-operated relay set including at least two interacting relays, contacts controlled by said relay set, means responsive to the operation of one contact at the beginning of a cycle for simultaneously operating said control circuits and means responsive to the operation of another contact at the end of a cycle for triggering said relaxation circuits from the second stable position back to the first.

GEORGE THOMAS BAKER.

REFERENCES CITED

The following references are of record in the file of this patent:

UNITED STATES PATENTS

| Number | Name | Date |
|---|---|---|
| 2,044,424 | Edwards et al. | June 16, 1936 |
| 2,408,727 | Blitz | Oct. 8, 1946 |
| 2,445,584 | Ramo | July 20, 1948 |
| 2,504,848 | Kunz | Apr. 18, 1950 |
| 2,544,685 | Jackson | Mar. 13, 1951 |